(12) United States Patent
Nishitani et al.

(10) Patent No.: US 7,096,691 B2
(45) Date of Patent: Aug. 29, 2006

(54) APPARATUS AND METHOD FOR BENDING GLASS SHEETS

(75) Inventors: Masami Nishitani, Mie (JP); Makoto Shinohara, Mie (JP)

(73) Assignee: Central Glass Company, Limited, Ube (JP)

( * ) Notice: Subject to any disclaimer, the term of this patent is extended or adjusted under 35 U.S.C. 154(b) by 429 days.

(21) Appl. No.: 10/305,401

(22) Filed: Nov. 27, 2002

(65) Prior Publication Data
US 2003/0110801 A1 Jun. 19, 2003

(30) Foreign Application Priority Data
Nov. 30, 2001 (JP) .............................. 2001-366430

(51) Int. Cl.
*C03B 40/04* (2006.01)
(52) U.S. Cl. .................... 65/25.4; 65/107; 65/182.2
(58) Field of Classification Search ................ 65/25.4, 65/107, 182.2
See application file for complete search history.

(56) References Cited

U.S. PATENT DOCUMENTS

| | | | |
|---|---|---|---|
| 3,409,422 A | 11/1968 | Gulotta et al. | |
| 4,664,692 A * | 5/1987 | Simomura et al. | 65/182.2 |
| 5,522,912 A | 6/1996 | Kobayashi et al. | |
| 6,014,873 A | 1/2000 | Hirotsu et al. | |
| 6,286,338 B1 * | 9/2001 | Boaz | 65/182.2 |
| 6,725,689 B1 * | 4/2004 | Honjo et al. | 65/106 |
| 2002/0148254 A1 * | 10/2002 | Nishitani et al. | 65/104 |

FOREIGN PATENT DOCUMENTS

| | | |
|---|---|---|
| JP | 49-10331 | 3/1974 |
| JP | 5-9037 | 1/1993 |
| JP | 6191867 | 7/1994 |
| JP | 7237928 | 9/1995 |
| JP | 8-151221 | 6/1996 |
| JP | 2809596 | 10/1998 |

* cited by examiner

*Primary Examiner*—Sean Vincent
(74) *Attorney, Agent, or Firm*—Crowell & Moring LLP

(57) ABSTRACT

An apparatus for bending a glass sheet includes a final hearth bed. This final hearth bed has a top surface that is upwardly convexly curved along a plane perpendicular to an axis of the glass sheet. The top surface has an upstream end, a downstream end that is at a level lower than that of the upstream end, and an intermediate point defined therebetween. The top surface has (a) a first section that extends from the upstream end to the intermediate point and that is parallel with the axis or upwardly inclined relative to the axis and (b) a second section that extends from the intermediate point to the downstream end and that is downwardly inclined relative to the axis. The final hearth bed has a bottom surface that is along the first direction or inclined downwardly relative to the first direction.

23 Claims, 6 Drawing Sheets

APPARATUS AND METHOD FOR BENDING GLASS SHEETS

BACKGROUND OF THE INVENTION

The present invention relates to an apparatus and a method for bending a glass sheet so that the glass sheet has a compound curvature for use in, e.g., an automobile window.

There are several methods for bending a glass sheet such as an automotive window glass. In one method, a glass sheet is heated to become soft and bent by making the heated glass sheet sag by gravitation in a mold. In another method, a glass sheet is heated and then pressed by press molds. In still another method, a glass sheet is heated and bent while floatingly conveyed over hearth beds in a furnace. More specifically, while the glass sheet is conveyed over a series of hearth beds in a conveyance direction (hereinafter "first direction"), hot gas is ejected toward the glass sheet so that the glass sheet is floated over the hearth beds. The hearth beds have upper surfaces curved along a plane perpendicular to the first direction. The glass sheet is thus heated with the hot gas, gradually sags by gravitation and is bent according to the curvature of the upper surfaces of the hearth beds. In a subsequent stage, the bent glass sheet is quenched in a quenching unit. Alternatively, the glass sheet may be conveyed by a series of rollers in the furnace and bent according to the curvature of the rollers. A decision as to which method should be used is made depending on the size and curvature of bent glass sheets to be fabricated.

Among the above methods, the method using the hearth beds in the furnace (hereinafter referred to as a hearth bed bending method) has the advantage in its productivity for bending the glass sheet along the plane perpendicular to the first direction. Thus, the glass sheets having a simple curvature can be fabricated at low cost by the heath bed bending method. To fabricate the glass sheets having a compound curvature in such a hearth bed bending method, it has been proposed to heat, bend and quench the glass sheets while conveying the glass sheets either upwardly or downwardly relative to the first direction in order to also bend the glass sheets relative to the first direction with a curvature radius of tens of thousand of millimeters. However, it is not easy to bend the glass sheet relative to the first direction while conveying the heated glass sheets because of the furnace structure.

U.S. Pat. No. 3,409,422, corresponding to Japanese Patent Examined Publication JP-B-49-10331, discloses an apparatus in which some hearth beds situated most downstream in a furnace and the lower air blower of a quenching unit are inclined downwardly relative to a first direction to form a curvature curved relative to both of the first direction and a direction (hereinafter "second direction) perpendicular to the first direction, thereby fabricating glass sheets having a compound curvature.

Furthermore, U.S. Pat. No. 6,014,873, corresponding to Japanese Patent Unexamined Publication JP-A-5-9037, discloses an apparatus in which some hearth beds situated most downstream in a furnace are inclined upwardly relative to the first direction so that the final hearth bed and the lower air blower of a quenching unit form an upwardly convex curvature, thereby fabricating glass sheets having a compound curvature. U.S. Pat. No. 5,522,912, corresponding to Japanese Patent Unexamined Publication JP-A-6-191867, discloses an apparatus in which the final hearth bed has a top surface of which at least a downstream part is curved relative to the first direction and is inclined upwardly, for fabricating glass sheets having a compound curvature.

In each of the above conventional apparatuses, the equipment thereof (especially, the final hearth bed) needs to be replaced and adjusted, when different kinds of products are to be fabricated. More specifically, in the U.S. Pat. Nos. 3,409,422 and 6,014,873, the above-mentioned downstream hearth beds and quenching unit need to be replaced with new ones. Then, the newly equipped hearth beds and quenching unit have to be positioned in place by adjusting their respective supports so as to be properly inclined and connected with each other. In U.S. Pat. No. 5,522,912, the final hearth bed has to be replaced with a new one. The newly equipped bed needs to be inclined upwardly by adjusting its support properly. Such replacement and adjustment require much time and labor, whereby the profitable merit of the hearth bed bending method (i.e., high productivity) cannot be maintained. In addition, there arises a problem that the position to take out the bent glass sheets from the apparatus may become too low, when the glass sheets are conveyed downwardly relative to the first direction through the apparatus.

In view of the foregoing, an apparatus has been developed as disclosed in Japanese Patent No. 2809596 (corresponding to Japanese Patent Unexamined Publication JP-A-8-151221) and Japanese Patent Unexamined Publication JP-A-7-237928, in order to save time and labor required to replace and adjust the equipment of the apparatus for fabrication of different kinds of products.

In an apparatus disclosed in Japanese Patent No. 2809596, the final hearth bed is arranged in alignment with other hearth beds for bending glass sheets to have a simple curvature. For bending glass sheets to have a compound curvature, the final hearth bed is rotated about a vertical axis of rotation, without being inclined, so that the upstream end surface of the final hearth bed forms a slight angle with the downstream end surface of a hearth bed next to the final hearth bed, and at the same time, the lower air blower of a quenching unit is inclined downwardly relative to the first direction. In this state, the top surface of the final hearth bed is curved upwardly relative to both the first and second directions, whereby the flat glass sheet is bent into a shape having a compound curvature. Thus, different kinds of products can be fabricated with ease, i.e., a glass sheet can be bent to have a simple curvature or to have a compound curvature with ease because the production line can be modified only by rotating the final hearth bed without replacing it with another one. It is also beneficial that the final hearth bed can be shared even in fabricating different kinds of products. However, when the glass sheet is to be bent with a smaller radius of curvature relative to the first direction, the final hearth bed has to be rotated further so that the top surface of the final hearth bed is curved with a smaller radius of curvature relative to the first direction. In such a case, the space between the final hearth bed and the hearth bed next to the final hearth bed becomes larger, which causes a pressure drop of gas ejection due to gas leak through the space. Buoyancy to float the glass sheet becomes weaker owing to the pressure drop. The glass sheet may be caused to rub against the hearth beds, thereby being formed with flaws and cracks.

Furthermore, in an apparatus disclosed in Japanese Patent Unexamined Publication JP-A-7-237928, one side of a bent glass sheet is quenched, and then, both sides of the bent glass sheet are quenched in order to modify a curvature of the bent glass sheet. It is however necessary to provide additional equipment, such as a gas blowing system for previously quenching one side of the bent glass sheet.

The copending and commonly assigned U.S. patent application Ser. No. 10/119,705, filed on Apr. 11, 2002, discloses an apparatus and a method for bending different kinds of glass sheets, using a final hearth bed having an axis extending between its upstream through its downstream end. This final hearth bed has (a) a top surface curved along a plane perpendicular to the axis with a predetermined curvature radius and (b) an upstream end surface including a first surface section tilted toward a downstream end surface of the final hearth bed so as to form an angle θ to the second direction. The final hearth bed is arranged in a furnace such that the first surface section of the final hearth bed is located adjacent to and substantially parallel to a downstream end surface of the adjacent (penultimate) hearth bed. The above U.S. Patent application discloses another final hearth bed having a top surface curved relative to both the first and second directions so as to be upwardly convex.

SUMMARY OF THE INVENTION

It is an object of the present invention to provide an apparatus and a method for bending a glass sheet so that the resulting glass sheet is free from flaws, that the level of a quenching unit in the subsequent step is not made to be too low, and that it is simple and easy to conduct replacement operations for producing glass sheets having different curvatures.

According to the present invention, there is provided an apparatus for bending a glass sheet. This apparatus comprises:

a furnace for heating the glass sheet, the furnace having an outlet opening for discharging the glass sheet;

at least one hearth bed housed in the furnace, for conveying the glass sheet in a first direction toward the outlet opening of the furnace; and a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined along a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis, the final hearth bed being arranged such that the bottom surface of the final hearth bed is along the first direction or inclined downwardly relative to the first direction.

According to the present invention, there is provided a method for bending a glass sheet. This method comprises the steps of:

(a) disposing in a furnace at least one hearth bed to convey the glass sheet in a first direction toward an outlet opening of the furnace over a top surface of the at least one hearth bed;

(b) disposing in the furnace a final hearth bed at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined along a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis;

(c) arranging the final hearth bed such that the bottom surface of the final hearth bed is along the first direction or inclined downwardly relative to the first direction;

(d) conveying the glass sheet toward the outlet opening of the furnace over the at least one hearth bed and the final hearth bed; and (e) heating the glass sheet during the step (d), thereby bending the glass sheet to have a compound curvature in conformity with the top surface of the final hearth bed.

DESCRIPTION OF THE EMBODIMENTS

Herein, a glass sheet having a compound curvature is defined as a glass sheet of three-dimensional shape, especially curved with desired curvature radii relative to both X- and Y-axis directions and thereby being convex in a Z-axis direction according to the orthogonal coordinate system. A glass sheet curved simply relative to one direction to be part-cylindrical is referred to as a glass sheet having a simple curvature. Further, the terms "upstream" and "downstream" are defined in relation to a direction in which the glass sheet is conveyed on one production line.

Figure 1:
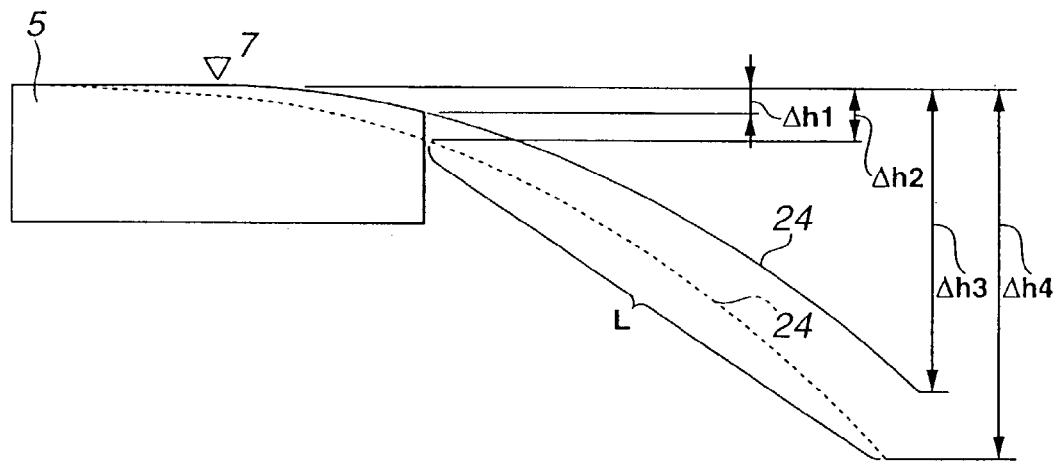
FIG. 1 is a schematic side view showing a first case (not according to the present invention) in which the top surface of the final hearth bed has a downward dotted curve from its upstream end and a second case (according to the present invention) in which the top surface has a downward solid curve from its middle point.
Figure 4A:
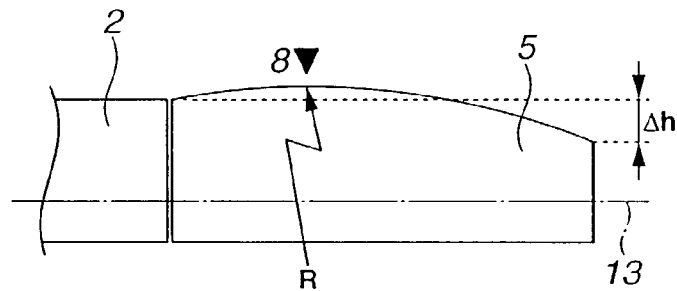
FIG. 4A is a longitudinal sectional view showing a final hearth bed according to a first embodiment of the present invention.

According to the present invention, it is possible to adjust the level of the apex of the top surface of the final hearth bed as low as possible and to adjust the level of the downstream end of the top surface of the final hearth bed as high as possible. For example, as shown in FIG. 4A, it is possible to prevent the occurrence of flaws by slightly lowering the level of the downstream end of the top surface and by lowering the level of the apex of the top surface. Thus, it is possible to prevent glass sheets from having flaws, even if a final hearth bed for producing glass sheets having a compound curvature has been set in a single and same furnace used for producing both of glass sheets of simple curvature and those of compound curvature. Furthermore, it is possible by the present invention to maintain the level of the downstream end of the top surface at a substantially higher level, as compared with a case (not according to the present invention) in which the top surface has a downward curve from its upstream end, provided that the curvatures or gradients of the top surfaces are the same, as schematically shown in FIG. 1. Thus, it is possible to maintain the conveyance system of the subsequent quenching unit at a relatively high level. Therefore, it is not necessary to dig a pit for accommodating the quenching unit or to conduct adjustment operations of the conveyance system at a position near the floor. Still furthermore, it is possible to easily adjust the level of the final hearth bed for producing different kinds of glass sheets. Thus, it is possible by the present invention to maintain high productivity of hearth bed bending methods.

Hereinafter, an explanation will be given of apparatuses and methods for bending glass sheets according to the present invention based on the following exemplary embodiments with reference to the drawings. It should be noted that the curvatures of a final hearth bed and an air blower as well as space between hearth beds are slightly exaggerated in the drawings for the purpose of illustration.

Figure 2:
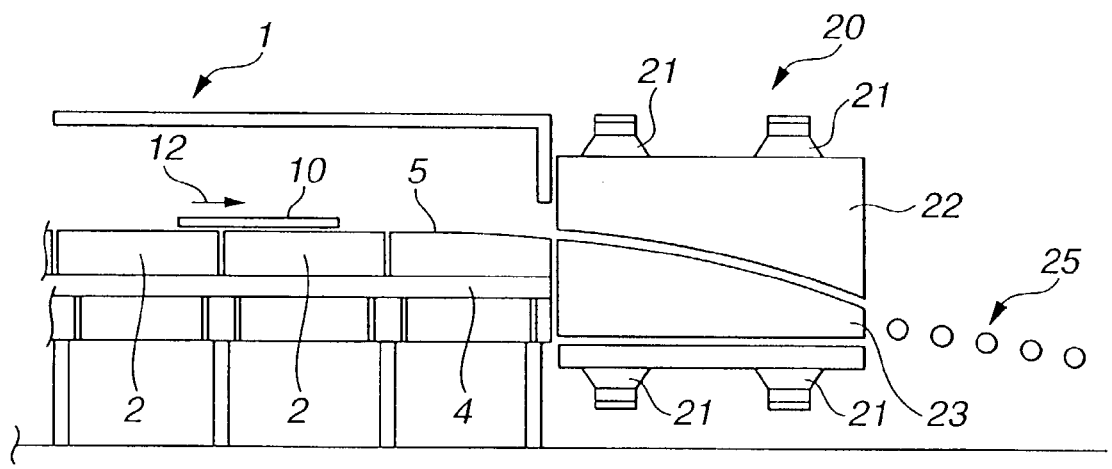
FIG. 2 is a longitudinal sectional view showing an apparatus for bending a glass sheet according to the present invention.

FIG. 2 shows an exemplary apparatus for bending a glass sheet 10 by using a hearth bed bending method. This apparatus comprises a gas hearth furnace 1 and a quenching unit 20. The apparatus further comprises a conveyor chain (not shown in the drawings) for conveying the glass sheet 10 in a conveyance direction 12 (rightward in FIG. 2; hereinafter "first direction", which is generally horizontal) through the apparatus. Pads (not shown) are put on the conveyor chain and used for holding the glass sheet 10.

The gas hearth furnace 1 is a tunnel furnace, and includes therein a bed support 4, a plurality of hearth beds 2 and a final hearth bed 5 situated downstream of the hearth beds 2. The bed support 4 may be formed of a single piece or some separate portions. The hearth beds 2 and 5 are generally rectangular and arranged in line on the bed support 4. Although a little space is provided between adjacent two of the hearth beds 2 and 5 as shown in FIG. 2, the hearth beds 2 and 5 may be arranged so as to contact with each other.

The hearth beds 2 and 5 have flat bottom surfaces, while the bed support 4 has a support surface that is flat though declines a little as will be described below. It is therefore possible to set the hearth beds 2 and 5 appropriately just by placing them on the bed support 4, without adjusting each of the hearth beds 2 and 5 so as to be inclined either upwardly or downwardly relative to the first direction throughout the furnace. In other words, the hearth beds 2 and 5 can be held in place when placed on the bed support 4. This makes it less labored to set the equipment of apparatus. Furthermore, the support surface of the bed support 4 declines toward the conveyor chain 3 at an angle of a few degrees with respect to a horizontal plane. Thus, the hearth beds 2 and 5 decline toward the conveyor chain at the same angle with respect to a horizontal plane when placed on the bed support 4. This makes it possible to easily support the glass sheet 10 by the pads put on the conveyor chain 3.

The most upstream hearth bed 2 and some other hearth beds 2 adjacent thereto have flat top surfaces. The remaining hearth beds 2 have top surfaces that are curved along a plane perpendicular to the first direction so as to have simple curvatures whose radii gradually decrease as the hearth beds 2 are located more downstream. At least one of the hearth beds 2 situated adjacent to the final hearth bed 5 has a top surface curved along the plane perpendicular to the first direction with a predetermined curvature radius, which is substantially equivalent to the curvature radius of a bent glass sheet to be fabricated.

Figure 3:
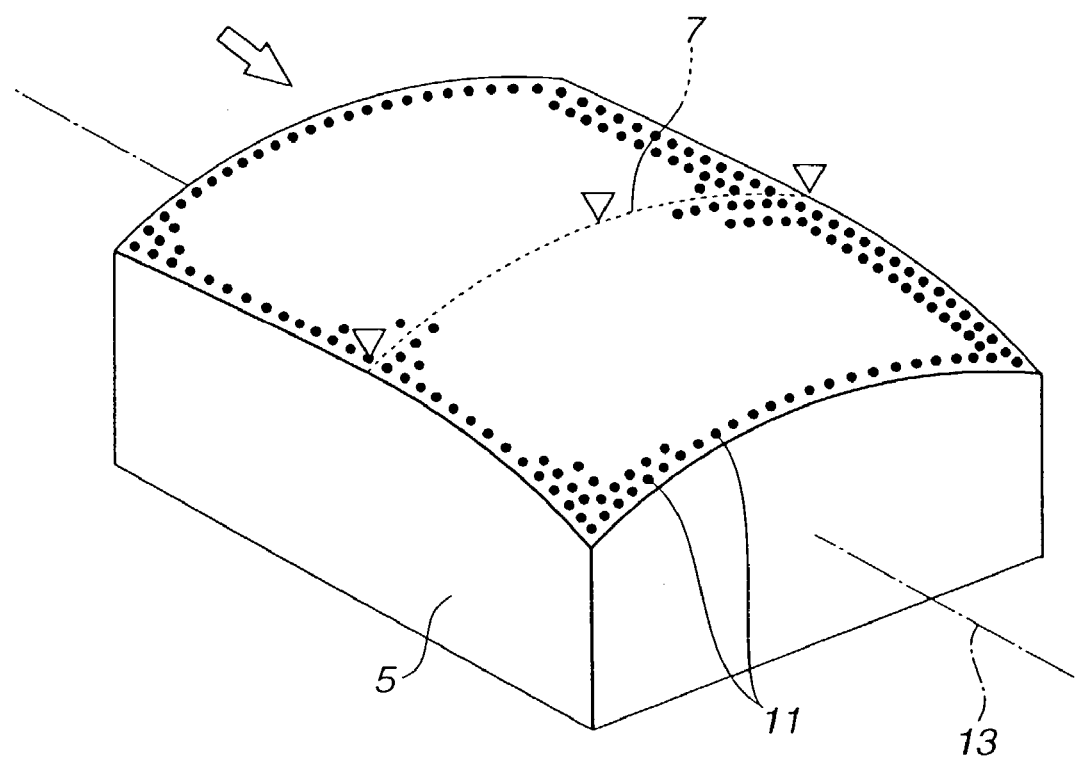
FIG. 3 is a perspective view showing a final hearth bed according to the present invention, corresponding to that of FIG. 4C.

Each of the hearth beds 2 and 5 is provided with a plurality of gas ejection holes 11 as shown in FIG. 3. While the glass sheet 10 is conveyed in the first direction through the gas hearth furnace 1 by means of the conveyor chain, hot gas is ejected from the gas ejection holes 11 so that the glass sheet 10 is held afloat over the hearth beds 2 and 5. The glass sheet 10 is then heated to a softening point with the hot gas while floatingly conveyed through the gas hearth furnace 1.

The quenching unit 20 is provided adjacent to the final hearth bed 5 via an outlet of the gas hearth furnace 1, and is supported by four support columns each being provided with a jack (not shown). The quenching unit 20 includes upper and lower air blowers 22 and 23. Each of the upper and lower air blowers 22 and 23 is provided with air ducts 21 through which cooling air is supplied to the upper and lower air blowers 22 and 23. The lower air blower 23 has a top surface curved relative to the second direction with substantially the same curvature as that of the final hearth bed 5. The upper air blower 22 has a bottom surface curved corresponding to the top surface of the lower air blower 23. Herein, the lower air blower 23 serves as a quenching bed. The glass sheet 10 is bent and then quenched rapidly with the cooling air blown from the upper and lower air blowers 22 and 23 and then conveyed by a roller conveyer system 25.

As is seen from FIG. 4A, there is provided a final hearth bed 5 (hereinafter referred to as "first final bed") according to the first embodiment of the present invention. The first final bed 5 has a top surface (conveyance surface) for conveying the glass sheet toward the outlet opening of the furnace. The first final bed 5 has a bottom surface and an axis 13 that is arranged along the bottom surface and toward the outlet opening of the furnace 1. The top surface is upwardly convexly curved to have a predetermined curvature defined along a plane that is perpendicular to the axis 13. This curvature is substantially in conformity with curvature of the glass sheet. The top surface has, in terms of stream of the glass sheet in the furnace (in the side view), (1) an upstream end, (2) a downstream end that is at a level lower than that of the upstream end by $\Delta h$, and (3) an apex (intermediate point) 8 that is positioned between the upstream and downstream ends and is at a level higher than the upstream and downstream ends. Thus, the top surface has (a) a first section that extends from the upstream end to the apex 8 and that is upwardly convexly curved relative to the axis 13 and (b) a second section that extends from the apex 8 to the downstream end and that is downwardly declined and upwardly convexly curved relative to the axis 13. In other words, the top surface has a smooth convex curve from the upstream end to the downstream end relative to the axis 13. Furthermore, the first final bed is arranged such that its bottom surface is supported on the bed support in a manner not to incline the bottom surface upwardly relative to the first direction. In other words, the bottom surface is along the first direction (as shown in FIG. 2) or inclined downwardly relative to the first direction. Furthermore, the quenching unit 20 is arranged downstream of the first final bed. This quenching unit 20 has the lower air blower 23 having a convexly curved surface (conveyance surface) having predetermined curvatures relative to the first and second directions. This curved surface is arranged relative to the top surface of the first final bed such that a first tangent to an upstream end portion of the curved surface is superposed on a second tangent to a downstream end portion of the top surface of the first final bed or is upwardly or downwardly inclined to have an angle ($\alpha$) to the second tangent.

A glass sheet tends to have flaws in case that the final hearth bed has a top surface of a small radius of curvature and has an apex that is at a level excessively higher than that of the upstream end. To prevent the occurrence of flaws, the downstream end of the top surface is made by the present invention to be at a level lower than that of the upstream end. With this, it is possible to efficiently fabricate glass sheets without the occurrence of flaws thereon.

Figure 6:
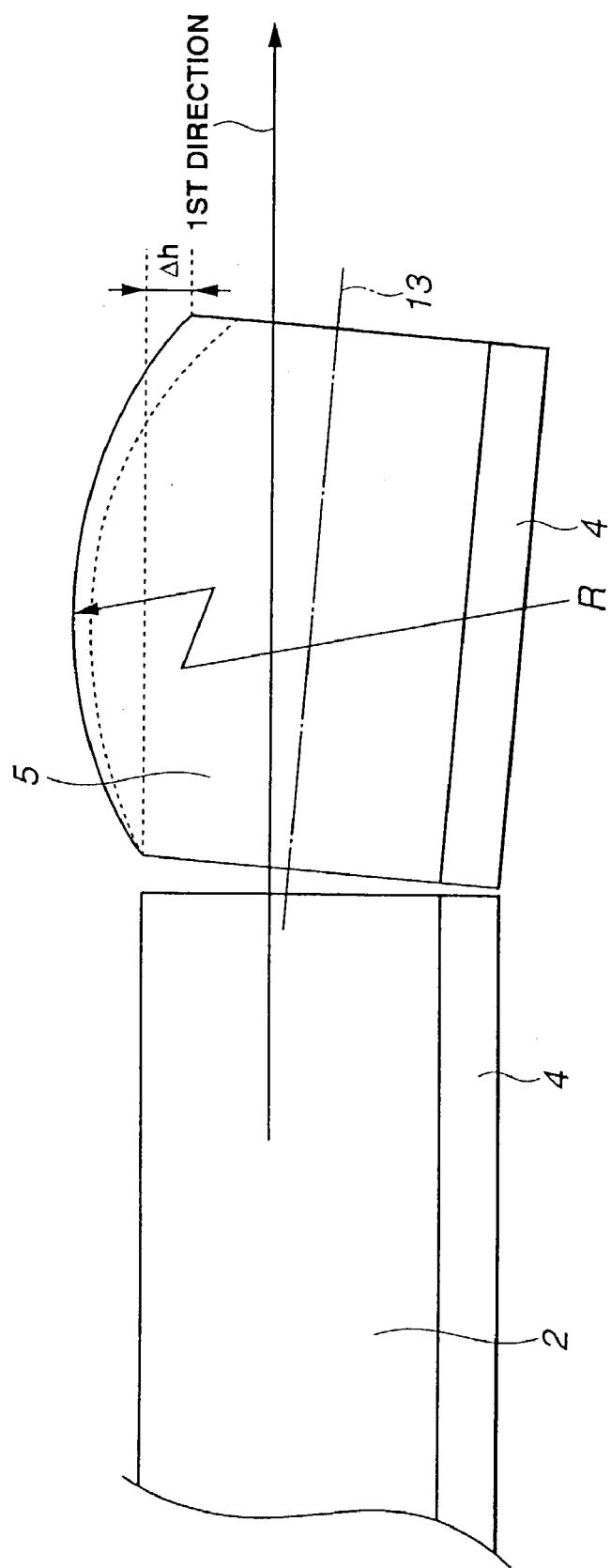
FIG. 6 is a view similar to FIG. 4A, but showing a condition in which the final hearth bed is downwardly inclined relative to the first direction, in which the solid line of the top surface of the final hearth bed represents a first case where the upstream and downstream ends of the top surface are at the same level if the final hearth bed is horizontally disposed, and in which the dotted line of the top surface of the final hearth bed represents a second case where the downstream end is at a position lower than that of the upstream end even if the final hearth bed is horizontally disposed as shown in FIG. 4A.

It is possible to make the level of the downstream end of the final hearth bed lower than that of the upstream end by previously preparing a final hearth bed, in which the downstream end is at a level lower than that of the upstream end, or by downwardly inclining the bed support in a way to make the level of the downstream end of the final hearth bed lower than that of the upstream end (see FIG. 6). Of these two measures, the first measure (i.e., the previous preparation of such final hearth bed) is preferable, since it is easy to adjust the level of the final hearth bed upon fabricating different kinds of glass sheets. In connection with the second measure, as is shown in FIG. 6, for example, it is possible to dispose a final hearth bed 5 (having a upwardly convexly curved top surface (solid line) of which upstream and downstream ends are at the same level when the final hearth bed 5 is horizontally disposed) on a bed support 4 that is downwardly inclined relative to the first direction. With this, it becomes possible to lower the level of the apex of the top surface, as compared with the case in which the final hearth bed 5 is horizontally disposed (see FIG. 4A). Therefore, it is possible to prevent the occurrence of flaws, while the downstream end is maintained at a generally high level.

In some cases, it is not preferable to use a final hearth bed (see FIG. 4A) having an apex of a level higher than that of the upstream end relative to the axis 13, depending on operational conditions specific to each gas hearth furnace (for example, the pressure of the air ejected from the gas ejection holes 11 for floating a glass sheet), since such final bed having an upwardly and convexly curved top surface may cause the occurrence of flaws on the bottom surface of the glass sheet. In such cases, it is not preferable either to use another final hearth bed (not according to the present invention) in which the level of its top surface lowers gradually from the upstream end to the downstream end, since such another final bed makes the downstream end of its top surface too low in level. It is particularly notable when a final bed has a convexly curved top surface relative to the axis 13 and besides the conveyance surface of the subsequent quenching unit also has a convexly curved surface (see FIGS. 1 and 2). Therefore, the level of the downstream end of the top surface of the final bed greatly influences the level of the conveyance system of the subsequent quenching unit. In other words, it is not preferable to make the level of the downstream end too low.

FIG. 1 shows a first case (not according to the present invention) in which the top surface of the final hearth bed has a downward dotted curve from its upstream end and a second case (according to the present invention) in which the top surface has a downward solid curve from its center point 7. As mentioned above, it is understood from FIG. 1 that the difference (vertical distance) between the levels of the first and second cases at the downstream end of the final hearth bed 5 is greatly magnified at the downstream end of the conveyance surface 24 of the quenching unit 20, as explained in the following.

In the first case (see the dotted line in FIG. 1), for example, under a condition that the top surface of the final bed and the conveyance surface 24 of the quenching unit each have a radius of curvature of 20,000 mm, that the final bed has a longitudinal length of 762 mm and that the arcuate length L along the conveyance surface of the quenching unit is about 2,000 mm, the difference ($\Delta h2$) between the upstream and downstream ends of the final bed becomes about 14.5 mm, and the difference ($\Delta h4$) between the upstream end of the final bed and the downstream end of the conveyance surface of the quenching unit becomes about 190 mm.

In contrast, in the second case (see the solid line in FIG. 1), under the same condition as above, the difference ($\Delta h1$) between the upstream and downstream ends of the final bed becomes about 3.6 mm, and the difference ($\Delta h3$) between the upstream end of the final bed and the downstream end of the conveyance surface of the quenching unit becomes about 142 mm.

As is seen from FIG. 2, the glass sheet 10 taken out of the quenching unit 20 is further conveyed by the roller conveyer system 25, which is downwardly inclined. Therefore, the level of the roller conveyer system 25 is further lower than that of the conveyance surface 24 of the quenching unit 20. Thus, it is preferable to adjust the downstream end of the final bed 5 at a higher level, even if the top surface of the final bed has a downward flat surface in contrast with the above-mentioned curved surface downwardly declined.

As is seen from FIGS. 4B and 4C, there are provided final hearth beds 5 (hereinafter "second and third final beds") according to the second embodiment of the present invention. These final beds 5 are slight modifications of the first final bed, as explained in the following. The top surface is upwardly convexly curved to have a predetermined curvature along a plane that is perpendicular to the axis 13. Each top surface of the second and third final beds is characterized in that its first section is parallel with the axis 13 from the upstream end to an intermediate point 7 and that its second section is downwardly inclined relative to the axis 13 from the intermediate point 7 to the downstream end. In fact, as is seen from FIG. 4B, the second final bed is characterized in that its second section is inclined downwardly and straight relative to the axis 13. In contrast, as is seen from FIG. 4C, the third final bed is characterized in that its second section is downwardly declined and upwardly convexly curved relative to the axis 13.

According to the second embodiment of the present invention, it is possible to maintain the downstream end of the top surface of the final bed at a higher level, as compared with a case in which the level of the top surface lowers gradually from the upstream end to the downstream end.

In the second embodiment of the present invention, the intermediate point 7 can also be referred to as a vertex. Although not shown in FIGS. 4B and 4C, it is optional to provide a plurality of vertexes between the upstream and downstream ends of the top surface of the final bed 5. Furthermore, it is optional to change radius of curvature or linear slope gradient at each vertex. In case that the top surface of the final bed declines straight (see FIG. 4B), it is preferable to arrange a more gradual gradient downslope section at the upstream position and a steeper gradient downslope section at the downstream position. Furthermore, it is preferable to round each vertex.

Figure 4B:
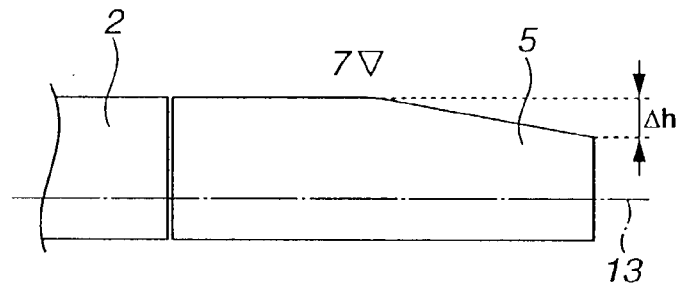
FIGS. 4B and 4C are views similar to FIG. 4A, but showing other final hearth beds according to a second embodiment of the present invention.
Figure 4C:
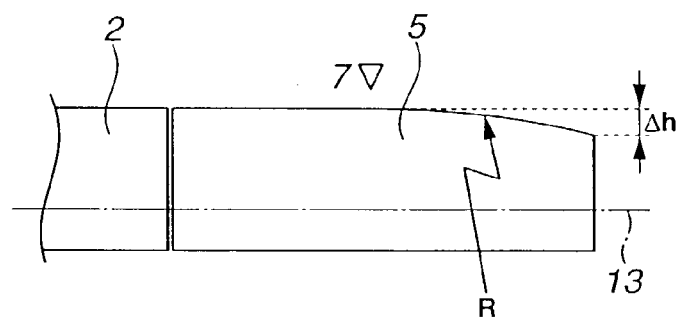

In the second embodiment of the present invention, it is preferable to position the intermediate point (the first vertex) 7 at around a central portion of the final bed 5 (as shown in FIGS. 4B and 4C) in case that the final bed has a size commonly used for bending glass sheets. It is preferable that a downstream curved portion of the top surface of the final bed has a certain length to make a glass sheet have a compound curvature by the downstream curved portion (see FIG. 4C). In case that the vertex 7 is positioned at around a central portion of the final bed 5 and that its top surface has a straight downslope (as shown in FIG. 4B), a glass sheet can slightly be bent at the vertex and then can further be bent by the corner formed by both tangents to the downstream end portion of the final hearth bed and to the upstream end portion of the lower air blower, when a first tangent to an upstream end portion of the curved surface of the lower air blower 23 of the quenching unit 20 is downwardly inclined to have an angle ($\alpha$) to a second tangent 9 to a downstream end portion of the top surface of the final bed 5.

Figure 4D:
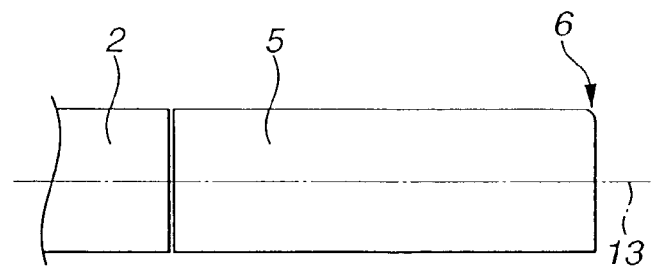
FIG. 4D is a view similar to FIG. 4A, but showing another final hearth bed according to a third embodiment of the present invention.

As is seen from FIG. 4D, there is provided a final hearth bed 5 (hereinafter "fourth final bed") according to the third embodiment of the present invention. This final bed 5 is a slight modification of the second and third final beds, as explained in the following. The fourth final bed is characterized in that the intermediate point of the top surface is adjacent to the downstream end such that the second section is defined as being a round corner. The first section is parallel with the axis 13 from the upstream end to the round corner. In contrast with the cases of the first to third final beds, the curved surface of the lower air blower 23 of the quenching unit 20 is arranged relative to the top surface of the fourth final bed such that the first tangent is horizontally or downwardly arranged to have an angle ($\alpha$).

The fourth final bed according to the third embodiment of the present invention can be used for fabricating glass sheets having a simple, two-dimensional curvature. The round corner of the final bed can prevent glass sheets from having flaws. It is, however, optional to omit the round corner in fabricating glass sheets to have a radius of curvature of 40,000 mm or greater.

The curve of the top surface of the final bed 5 (shown in FIGS. 4A and 4C) is almost in conformity with a typical curvature of glass sheets, but is not limited to an arch of a circle. That is, it may be a smooth curve that is not an arch of a circle. It is possible to change and adjust curvature of a glass sheet having a compound curvature by a certain degree by using the same single final bed. It is possible to change and adjust curvature of glass sheets relative to the first direction by a certain degree, for example, by adjusting temperature at the outlet of the furnace or by changing the angle of the lower air blower 23 relative to the final bed 5. Thus, it is not necessary to prepare a plurality of different final beds for fabricating glass sheets of different curvatures.

Furthermore, the gas hearth furnace 1 has a plurality of temperature zones along the first direction, and can control the temperature in each temperature zone. The temperatures in some temperature zones located most downstream, which occupy 20% of the gas hearth furnace 1 in length, may be changed so as to modify the curvature of the bent glass sheet. It is especially effective for modification of the curvature to change the temperatures in the last three temperature zones located most downstream, which occupy 15% of the gas hearth furnace 1 in length. More specifically, the glass sheet 10 can be bent with a larger curvature radius relative to the first direction, when the temperatures in the above temperature zones are decreased. On the other hand, the glass sheet 10 can be bent with a smaller curvature radius along relative to the first direction, when the temperatures in the above temperature zones are increased. The temperatures in the above temperature zones may be set at the same value or set at gradually varying values from upstream to downstream. The temperatures in the temperature zones can be determined in consideration of, e.g., the heating capacity of the gas hearth furnace 1 and the properties of the glass sheet 10.

Figure 5:
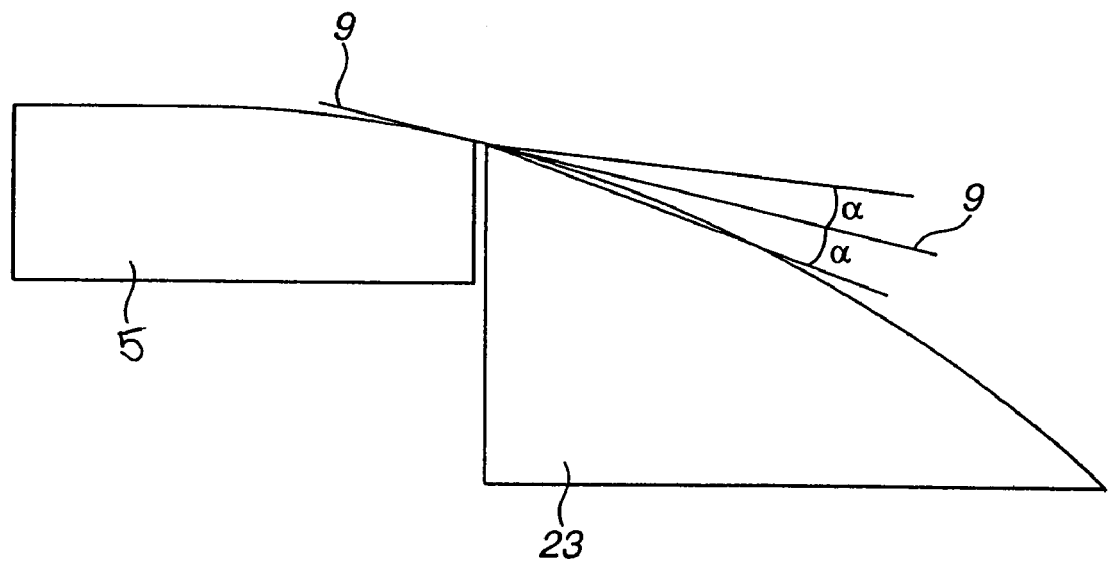
FIG. 5 is a schematic sectional view showing a connection (according to the present invention) between a final hearth bed and a lower air blower of a quenching unit.

The quenching unit 20 may be disposed in such a manner that the first tangent to an upstream end portion of the top surface of the lower air blower 23 forms an angle $\alpha$ relative to the second tangent 9 to a downstream end portion of the top surface of the final hearth bed 5 as shown in FIG. 5, so as to modify the curvature of the bent glass sheet. More specifically, the glass sheet 10 can be bent with a larger curvature radius relative to the first direction, when the lower air blower 23 is inclined relative to the first direction upwardly at the angle $\alpha$. On the other hand, the glass sheet 10 can be bent with a smaller curvature radius relative to the first direction, when the lower air blower 23 is inclined relative to the first direction, downwardly at the angle $\alpha$. The angle $\alpha$ is adjusted in such a manner that the first tangent is inclined downwardly relative to the first direction, which is generally horizontal.

Figure 7:
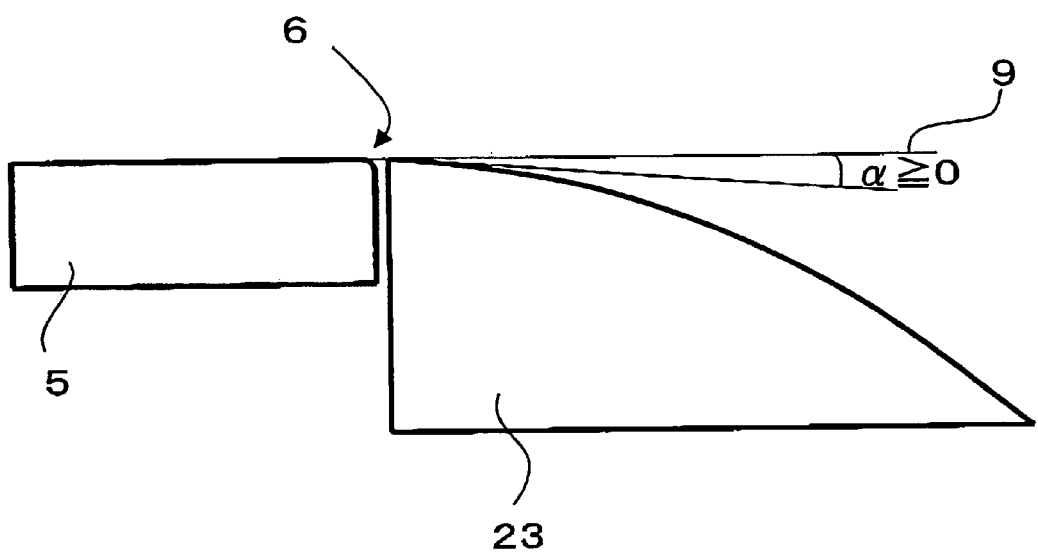
FIG. 7 is a schematic sectional view showing a connection between a final hearth bed and a lower air blower of a quenching unit.

FIG. 7, shows the final hearth bed 5 where the second tangent 9 may be horizontally arranged. When $\alpha=0$, the first tangent is horizontally arranged, too. This means that the first tangent is superposed on the second tangent 9. When $\alpha<0$, the first tangent is downwardly arranged to the second tangent 9, as shown in FIG. 7.

As described above, it is possible to modify the curvature of the bent glass sheet just by controlling the temperatures in the temperature zones, and/or by adjusting the inclination angle $\alpha$ of the quenching unit 20. The lower air blower 23 of the quenching unit 20 is supported by four support columns provided with jacks. It is possible to adjust the angle $\alpha$ by changing the height and angle of the lower air blower 23 with the jacks.

The following nonlimitative examples are illustrative of the present invention.

EXAMPLE 1

A glass sheet having a size of 820 mm×520 mm and a thickness of 3.5 mm was bent using the apparatus as shown in FIG. 2. The final hearth bed (shown in FIG. 4A) had a top surface curved with a curvature radius of 20,000 mm relative to the first direction and a curvature radius of 1,250 mm along a plane perpendicular to the first direction. Thus, the final bed had a conveyance surface of a compound curvature that was upwardly curved and that had the above curvature relative to the first direction. The final hearth bed was placed horizontally on the bed support 4 without putting any inclination relative to the first direction. In other words, the bottom surface of the final hearth bed was placed on the flat top surface of the bed support. When the center of a circle defined as having an arch superposed on the curved top surface relative to the first direction was placed at a position away from the upstream end of the final bed 5 by a distance 254 mm, that is, ⅓ of the total longitudinal length of the final bed, relative to the first direction, the apex 8 was at a position higher than the upstream end by about 1.6 mm, and the downstream end was lower than the upstream end by a distance (Δh) of about 5 mm. The lower air blower 23 of the quenching unit 20 had predetermined curvature radii relative to both the first and second directions. The quenching unit 20 was disposed relative to the final bed 5 such that the first tangent to the upstream end portion of the conveyance surface of the lower air blower 23 was downwardly inclined to have an angle (α) of 0.2 degrees to the second tangent 9 to the downstream end portion of the top surface of the final bed 5.

The obtained bent glass sheet had a compound curvature with a curvature radius of 22,330 mm relative to the first direction, which was preferable as an automotive glass sheet.

EXAMPLE 2

A glass sheet having a size of 820 mm×520 mm and a thickness of 3.5 mm was bent using the apparatus as shown in FIG. 2. The final hearth bed (shown in FIG. 4C) had a top surface curved with (b) a curvature radius of 20,000 mm relative to the first direction from the intermediate point 7 (positioned at about center between the upstream and downstream ends) to the downstream end and (a) a curvature radius of 1,250 mm through the whole final bed relative to the second direction. Thus, the final bed had a conveyance surface of (a) a simple curvature from the upstream end to the intermediate point 7 and of (b) a compound curvature that was downwardly declined and convexly curved and that had the above curvature relative to the first direction. The final hearth bed was placed on the bed support 4 without putting any inclination relative to the first direction. In other words, the bottom surface of the final hearth bed was placed on the flat top surface of the bed support. The downstream end was lower than the upstream end by a distance (Δh) of 3.6 mm. The lower air blower 23 of the quenching unit 20 had predetermined curvature radii relative to both the first and second directions. The quenching unit 20 was disposed relative to the final bed 5 such that the first tangent to the upstream end portion of the conveyance surface of the lower air blower 23 was downwardly inclined to have an angle (α) of 0.2 degrees to the second tangent 9 to the downstream end portion of the top surface of the final bed 5.

The obtained bent glass sheet had a compound curvature with a curvature radius of 23,240 mm relative to the first direction, which is preferable as an automotive glass sheet.

The entire contents of Japanese Patent Application No. 2001-366430 (filed Nov. 30, 2001), of which priority is claimed in the present application, are incorporated herein by reference.

What is claimed is:

1. An apparatus for bending a glass sheet, said apparatus comprising:

a furnace for heating the glass sheet, the furnace having an outlet opening for discharging the glass sheet;

at least one hearth bed housed in the furnace, for conveying the glass sheet in a first direction toward the outlet opening of the furnace; and a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined along a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis, the final hearth bed being arranged such that the bottom surface of the final hearth bed is along the first direction or inclined downwardly relative to the first direction, wherein the first section is parallel with the axis, and wherein the intermediate point is at a middle portion defined between the upstream and downstream ends.

2. An apparatus for bending a glass sheet, said apparatus comprising:

a furnace for heating the glass sheet, the furnace having an outlet opening for discharging the glass sheet;

at least one hearth bed housed in the furnace, for conveying the glass sheet in a first direction toward the outlet opening of the furnace; and a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined alone a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis, the final hearth bed being arranged such that the bottom surface of the final hearth bed is along the first direction or inclined downwardly relative to the first direction, wherein the first section is upwardly convexly curved relative to the axis from the upstream end to the intermediate point, and the second section is downwardly declined and upwardly convexly curved relative to the axis from the intermediate point to the downstream end, such that the top surface has a smooth convex curve relative to the axis from the upstream end to the downstream end.

3. An apparatus according to claim 1, wherein the second section is downwardly declined and straight relative to the axis.

4. An apparatus according to claim 1, wherein the second section is downwardly declined and upwardly convexly curved relative to the axis from the intermediate point to the downstream end.

5. An apparatus according to claim 1, wherein the final hearth bed is supported on a bed support in the furnace.

6. An apparatus according to claim 5, wherein the bottom surface of the final hearth bed is along the first direction.

7. An apparatus according to claim 1, wherein each of the at least one hearth bed and the final bed has a plurality of hot air ejection holes for ejecting hot air to keep the glass sheet out of contact with the at least one hearth bed and the final bed.

8. An apparatus according to claim 1, further comprising a quenching unit for quenching the glass sheet, the quenching unit being arranged downstream of the final hearth bed and having a curved surface for conveying the glass sheet, the curved surface being arranged relative to the top surface of the final hearth bed such that a first tangent to an upstream end portion of the curved surface is superposed on a second tangent to a downstream end portion of the top surface of the final hearth bed or is upwardly or downwardly inclined to have an angle ($\alpha$) to the second tangent.

9. An apparatus according to claim 8, wherein the curved surface is a top surface of a lower air blower of the quenching unit.

10. An apparatus for bending a glass sheet, said apparatus comprising:
 a furnace for heating the glass sheet, the furnace having an outlet opening for discharging the glass sheet;
 at least one hearth bed housed in the furnace, for conveying the glass sheet in a first direction toward the outlet opening of the furnace; and
 a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined along a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis, the final hearth bed being arranged such that the bottom surface of the final hearth bed is along the first direction or inclined downwardly relative to the first direction, wherein the intermediate point of the top surface is adjacent to the downstream end such that the second section is defined as being a round corner, and wherein the apparatus further comprises a quenching unit for quenching the glass sheet, the quenching unit being arranged downstream of the final hearth bed and having a curved surface for conveying the glass sheet, the curved surface being arranged relative to the top surface of the final hearth bed such that a first tangent to an upstream end portion of the curved surface is horizontally or downwardly arranged to have an angle ($\alpha$) to a second tangent to a downstream end portion of the top surface of the final hearth bed.

11. An apparatus according to claim 10, wherein the curved surface is a top surface of a lower air blower of the quenching unit.

12. A method for bending a glass sheet by using an apparatus comprising:
 a furnace for heating the glass sheet, the furnace having an outlet opening for discharging the glass sheet;
 at least one hearth bed housed in the furnace, for conveying the glass sheet in a first direction toward the outlet opening of the furnace; and
 a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined along a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis, the final hearth bed being arranged such that the bottom surface of the final hearth bed is along the first direction or inclined downwardly relative to the first direction, wherein the first section is parallel with the axis, and wherein the intermediate point is at a middle portion defined between the upstream and downstream ends the method comprising the steps of:
(a) conveying the glass sheet toward the outlet opening of the furnace over the at least one hearth bed and the final hearth bed; and
(b) heating the glass sheet during the step (a), thereby bending the glass sheet to have a compound curvature in conformity with the top surface of the final hearth bed.

13. A method according to claim 12, further comprising the steps of:

(c) arranging a quenching unit for quenching the glass sheet at a position downstream of the final hearth bed; and (d) arranging a curved surface of the quenching unit relative to the top surface of the final hearth bed such that a first tangent to an upstream end portion of the curved surface is superposed on a second tangent to a downstream end portion of the top surface of the final hearth bed or is upwardly or downwardly inclined to have an angle ($\alpha$) to the second tangent.

14. A method for bending a glass sheet, comprising the steps of:

(a) disposing in a furnace at least one hearth bed to convey the glass sheet in a first direction toward an outlet opening of the furnace over a top surface of the at least one hearth bed;

(b) disposing in a furnace a final hearth bed at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having an axis that is arranged toward the outlet opening of the furnace, the top surface of the final hearth bed being upwardly convexly curved to have a first curvature defined along the axis and a second curvature along a plane that is perpendicular to the axis, the top surface of the final hearth bed having, in terms of stream of the glass sheet in the furnace, upstream and downstream ends;

(c) arranging the final hearth bed on a bed support to downwardly incline the final hearth bed relative to the first direction such that the downstream end of the final hearth bed is at a level lower than that of the upstream end of the final hearth bed and such that an intermediate apex of the final hearth bed is at a level higher than that of the upstream end of the final hearth bed, the intermediate apex being defined on the top surface of the final hearth bed and defined between the upstream and downstream ends in terms of stream of the glass sheet, when the final hearth bed is downwardly inclined by the step (c);

(d) conveying the glass sheet toward the outlet opening of the furnace over the at least one hearth bed and the final hearth bed;

(e) heating the glass sheet during the step (d), thereby bending the glass sheet to have a compound curvature in conformity with the top surface of the final hearth bed;

(f) arranging a quenching unit for quenching the glass sheet at a position downstream of the final hearth bed; and (g) arranging a curved surface of the quenching unit relative to the top surface of the final hearth bed such that a first tangent to an upstream end portion of the curved surface of the quenching unit is superposed on a second tangent to a downstream end portion of the top surface of the final hearth bed or is upwardly or downwardly inclined to have an angle ($\alpha$) to the second tangent.

15. An apparatus for bending a glass sheet, said apparatus comprising:

(a) a furnace for heating the glass sheet, the furnace having an outlet opening for discharging the glass sheet;

(b) at least one hearth bed housed in the furnace, for conveying the glass sheet in a first direction toward the outlet opening of the furnace;

(c) a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having an axis that is arranged toward the outlet opening of the furnace, the top surface of the final hearth bed being upwardly convexly curved to have a first curvature defined along the axis and a second curvature along a plane that is perpendicular to the axis, the top surface of the final hearth bed having, in terms of stream of the glass sheet in the furnace, upstream and downstream ends, the final hearth bed being in an arrangement on a bed support to downwardly incline the final hearth bed relative to the first direction such that the downstream end of the final hearth bed is at a level lower than that of the upstream end of the final hearth bed and such that an intermediate apex of the final hearth bed is at a level higher than that of the upstream end of the final hearth bed, the intermediate apex being defined on the top surface of the final hearth bed and defined between the upstream and downstream ends in terms of stream of the glass sheet, when the final hearth bed is in the arrangement; and (d) a quenching unit for quenching the glass sheet, the quenching unit being arranged at a position downstream of the final hearth bed and having a curved surface for conveying the glass sheet, the curved surface of the quenching unit being arranged relative to the top surface of the final hearth bed such that a first tangent to an upstream end portion of the curved surface of the quenching unit is superposed on a second tangent to a downstream end portion of the top surface of the final hearth bed or is upwardly or downwardly inclined to have an angle ($\alpha$) to the second tangent.

16. An apparatus according to claim 2, wherein the final hearth bed is supported on a bed support in the furnace.

17. An apparatus according to claim 16, wherein the bottom surface of the final hearth bed is along the first direction.

18. An apparatus according to claim 2, wherein each of the at least one hearth bed and the final bed has a plurality of hot air ejection holes for ejecting hot air to keep the glass sheet out of contact with the at least one hearth bed and the final bed.

19. An apparatus according to claim 2, further comprising a quenching unit for quenching the glass sheet, the quenching unit being arranged downstream of the final hearth bed and having a curved surface for conveying the glass sheet, the curved surface being arranged relative to the top surface of the final hearth bed such that a first tangent to an upstream end portion of the curved surface is superposed on a second tangent to a downstream end portion of the top surface of the final hearth bed or is upwardly or downwardly inclined to have an angle (α) to the second tangent.

20. An apparatus according to claim 19, wherein the curved surface is a top surface of a lower air blower of the quenching unit.

21. An apparatus according to claim 10, wherein the curved surface of the quenching unit is arranged relative to the top surface of the final hearth bed such that the first tangent is downwardly arranged to have the angle (α) to the second tangent.

22. A method for bending a glass sheet by using an apparatus comprising:
- a furnace for heating the glass sheet, the furnace having an outlet opening for discharging the glass sheet;
- at least one hearth bed housed in the furnace, for conveying the glass sheet in a first direction toward the outlet opening of the furnace; and
- a final hearth bed housed in the furnace at a position between the at least one hearth bed and the outlet opening of the furnace, the final hearth bed having a top surface for conveying the glass sheet toward the outlet opening of the furnace while bending the glass sheet to have a curved shape in conformity with the top surface, the final hearth bed having a bottom surface and an axis that is arranged along the bottom surface and toward the outlet opening of the furnace, the top surface being upwardly convexly curved to have a curvature defined along a plane that is perpendicular to the axis, the top surface having, in terms of stream of the glass sheet in the furnace, (1) an upstream end, (2) a downstream end that is at a level lower than that of the upstream end, and (3) an intermediate point defined between the upstream and downstream ends, the top surface having (a) a first section that extends from the upstream end to the intermediate point and that is parallel with the axis or upwardly inclined relative to the axis and (b) a second section that extends from the intermediate point to the downstream end and that is downwardly inclined relative to the axis, the final hearth bed being arranged such that the bottom surface of the final hearth bed is along the first direction or inclined downwardly relative to the first direction, wherein the first section is upwardly convexly curved relative to the axis from the upstream end to the intermediate point, and the second section is downwardly declined and upwardly convexly curved relative to the axis from the intermediate point to the downstream end, such that the top surface has a smooth convex curve relative to the axis from the upstream end to the downstream end, the method comprising the steps of:
- (a) conveying the glass sheet toward the outlet opening of the furnace over the at least one hearth bed and the final hearth bed; and
- (b) heating the glass sheet during the step (a), thereby bending the glass sheet to have a compound curvature in conformity with the top surface of the final hearth bed.

23. A method according to claim 22, further comprising the steps of:
- (c) arranging a quenching unit for quenching the glass sheet at a position downstream of the final hearth bed; and
- (d) arranging a curved surface of the quenching unit relative to the top surface of the final hearth bed such that a first tangent to an upstream end portion of the curved surface is superposed on a second tangent to a downstream end portion of the top surface of the final hearth bed or is upwardly or downwardly inclined to have an angle (α) to the second tangent.

* * * * *